Sept. 6, 1966  E. LEATHAM ET AL  3,271,117
APPARATUS FOR RECOVERY OF MAGNESIAN VALUES
Original Filed May 22, 1963  2 Sheets-Sheet 1

INVENTORS
ALBERT H. PACK,
EARL LEATHAM &
BY ERNEST P. WEAVER

William C. Noolen
ATTORNEY

Sept. 6, 1966     E. LEATHAM ET AL     3,271,117
APPARATUS FOR RECOVERY OF MAGNESIAN VALUES
Original Filed May 22, 1963     2 Sheets-Sheet 2
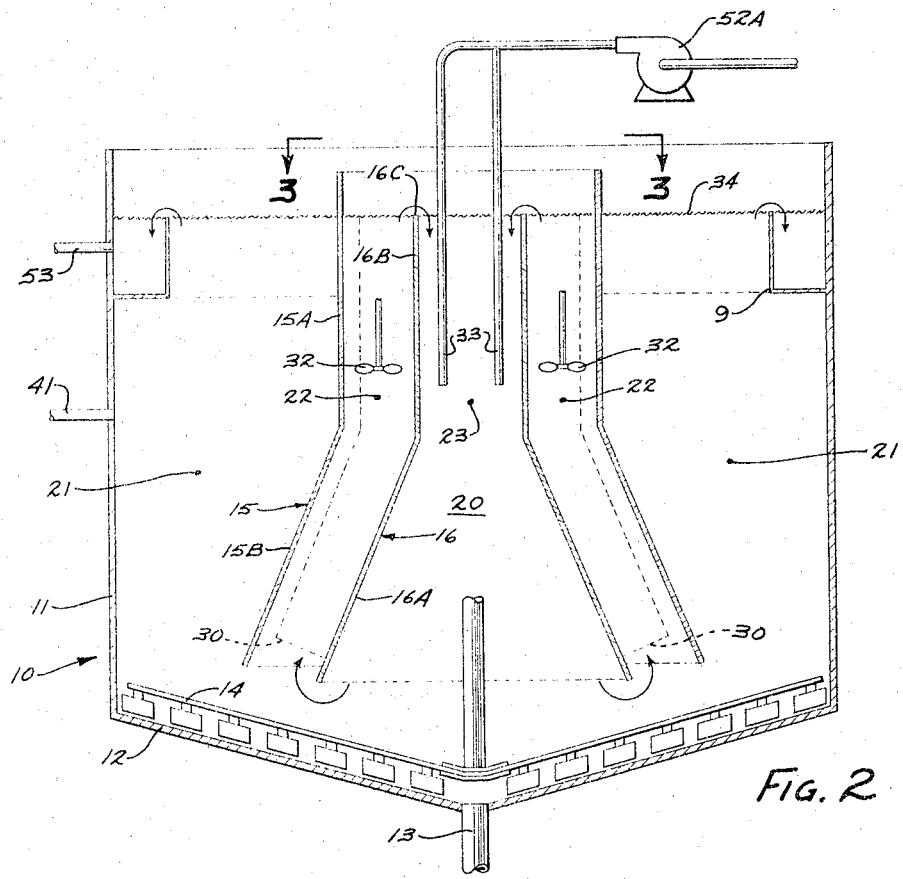
FIG. 2
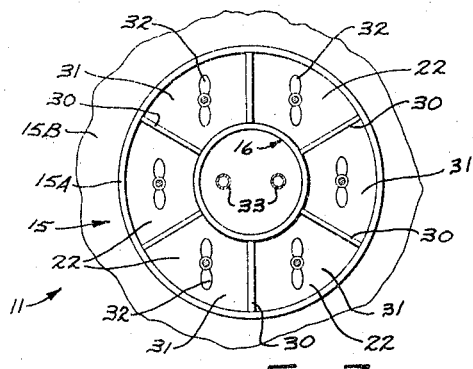
FIG. 3
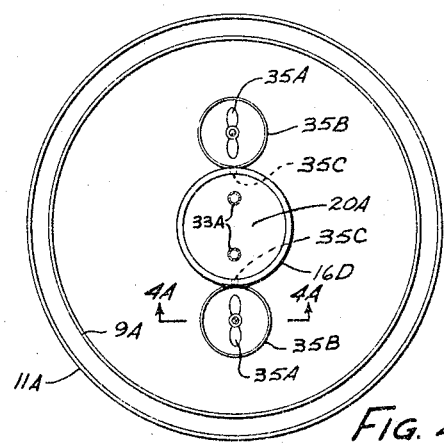
FIG. 4
FIG. 4A
INVENTORS
ALBERT H. PACK,
EARL LEATHAM &
BY ERNEST P. WEAVER
ATTORNEY APPARATUS FOR RECOVERY OF
MAGNESIUM VALUES
Earl Leatham, Wexford, Pa., Albert H. Pack, Ludington, Mich., and Ernest P. Weaver, Pittsburgh, Pa., assignors to Harbison-Walker Refractories Company, Pittsburgh, Pa., a corporation of Pennsylvania
Original application May 22, 1963, Ser. No. 282,379. Divided and this application Oct. 20, 1965, Ser. No. 498,412
8 Claims. (Cl. 23—287)

This application is a divisional application of Serial Number 282,379, filed May 22, 1963, having the same inventors and assignee.

This invention relates to the beneficiation of soluble magnesium salt-containing aqueous solutions and, in a particular embodiment, to apparatus for the recovery of the magnesian values of natural and synthetic brines, to be used in the production of high purity dead burned magnesite.

Dead burned magnesite, an essential component of most basic refractory brick, consists primarily of magnesia (MgO) in the form of the mineral periclase. It derives its name from the fact it was formerly produced exclusively from a mineral called magnesite ($MgCO_3$). The name persists today, even though it is now produced largely by dead burning magnesium hydrate precipitated from sea water, bitterns and inland brines, and to a limited extent by dead burning the naturally-occurring mineral brucite ($Mg(OH)_2$).

"Dead burning" of magnesite refers generally to a process of firing magnesite, or other substances convertible to magnesia (MgO), at temperatures sufficiently high to drive off practically all volatiles; and to effect almost complete shrinkage of the resultant material thereby producing hard, dense grains, which are almost entirely inert to atmospheric hydration and carbonation and free from excessive shrinkage when again subjected to elevated temperature. This shrunken dead burned grain material is also called periclase, which is descriptive of the crystalline form of the dead burned magnesia.

This invention relates particularly to recovery of a magnesium hydrate precipitated from concentrated magnesium chloride-containing solution, by precipitating the magnesium in these solutions with calcined limestone or dolomite, either slaked or unslaked, according to the reaction

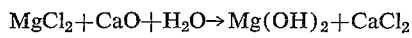

or

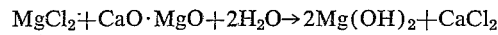

This magnesium hydrate is washed to remove the $CaCl_2$ and then dead burned to obtain periclase for refractory uses.

Relating, as this invention does, to improvements in the art of obtaining magnesium hydrate from certain brines, and to novel apparatus for the practice of these improvements, extensive discussion of the chemistry involved is not believed warranted. Rather, the prior art U.S. patents to Vettel et al., "Process of Preparing Magnesium Hydroxide," No. 2,692,816, Vettel el al., "Production of Magnesium Compounds," No. 2,893,840, Robinson et al., "Magnesium Hydroxide From Sea Water," No. 2,405,055, are noted as providing adequate background. As these patents will evidence, it has been the desideratum of workers in the art to recover high purity magnesia from sea water, or other magnesium containing brines, and to make this recovery highly efficient. Lacking efficiency, operating costs are high, because of the great volume of fluid which must be handled. Most prior art processes have involved rather extensive systems of conduit and vessels, and large supplies of fresh water, all of which required careful supervision and control.

Accordingly, it is an object of this invention to provide improved method and apparatus for the recovery of magnesian values from magnesium ion-containing brines, bitterns, sea water, and the like. It is another object of the invention to provide a simplified method and apparatus for the recovery of magnesian values from magnesium ion-containing brines. It is still another object of this invention to provide improved method and apparatus for the recovery of high purity magnesium hydroxide, capable of being converted to high purity refractory grade periclase by dead burning.

In the past, using conventional reaction methods, it has been found that a concentrated brine of high magnesium ion content could not be used to produce $Mg(OH)_2$. By a concentrated brine, we mean a brine which has on the order 250 to 350 grams of magnesium chloride per liter. This is about 100–150 grams per liter calculated as MgO. With such a concentrated brine, the reaction was slow and incomplete. This generally resulted in excessive lime in the final product. In addition, thickening and filtration were difficult and washing was poor. Prior methods did not provide means for adequate dilution of the reactants. A concentrated brine of the type herein discussed would be such as the bitterns discharged from solar evaporation processes for recovering potassium salts from brines.

Accordingly, it is another object of the invention to provide method and apparatus for recovering $Mg(OH)_2$ from concentrated brines, using a free lime containing material such as calcined limestone or dolomite either slaked or unslaked as the precipitant.

We have discovered a method of producing $Mg(OH)_2$ from concentrated brines, which method is carried out in simplified apparatus and which does not require dilution of the brine with fresh water. By way of example, we consider the application of our process to end brines of the type discharged from the solar evaporation process of recovering potassium salts from the Dead Sea water. It has been discovered that this concentrated end brine must be reduced from over about 350 grams of magnesium chloride per liter to less than 1.0 grams per liter before reaction with lime slurry, which must also be diluted to less than 1.0 grams CaO per liter, to precipitate magnesium hydroxide. Preferably, the magnesium chloride and calcium oxide concentrations fall between 0.1 and 1.0 grams per liter. Optimum results are obtained when the dilution is such as to have between 0.25 and 0.5 gram per liter. We obtain this dilution by addition of previously precipitated magnesium hydroxide slurry which is substantially free of magnesium ions. In this specification, and in the claims, we term this an aqueous carrier fluid which is essentially free of magnesium ions. Thus, continuing the example, with each unit volume of 350 grams magnesium chloride per liter brine we must add at least 350 volumes of our aqueous carrier fluid, which is free of magnesium ions and with each unit weight of calcium oxide we must add at least 1000 weights of the aqueous carrier fluid.

Briefly in the recovery of magnesian values from concentrated magnesium salt-containing aqueous solutions, according to the practice of this invention, we initially form a slurry by mixing a measured amount of a free lime containing material such as calcined limestone or dolomite either slaked or unslaked, with an aqueous carrier fluid which is essentially free of magnesium ions. An additional quantity of this aqueous carrier fluid has introduced into it, a stream containing a stoichiometric amount of a concentrated magnesium ion containing solution. These two diluted streams discharge into a reactor where they are diluted still further and then reacted to precipitate magnesium hydroxide. This magnesium hydroxide slurry, substantially free of magnesium ion in solution is withdrawn from the reactor, part of it being used as the aqueous carrier fluid mentioned above and the balance going to further processing. The total aqueous carrier fluid introduced into the two concentrated streams is sufficient to dilute these streams going to the reactor to less than about 1 gram of calcium oxide or magnesium chloride per liter.

A better understanding, and other objects and features of this invention will become obvious to those skilled in the art by a study of the following detailed description with reference to the drawings. In these drawings:

FIG. 2 is a schematic diagram of apparatus particularly suited for the practice of this invention;

FIG. 3 is a top view of the apparatus of FIG. 2;

FIG. 4 is an alternative construction for the apparatus of FIG. 2, and

FIG. 4A is a fragmentary view of a portion of the apparatus of FIG. 4.

Figure 1:
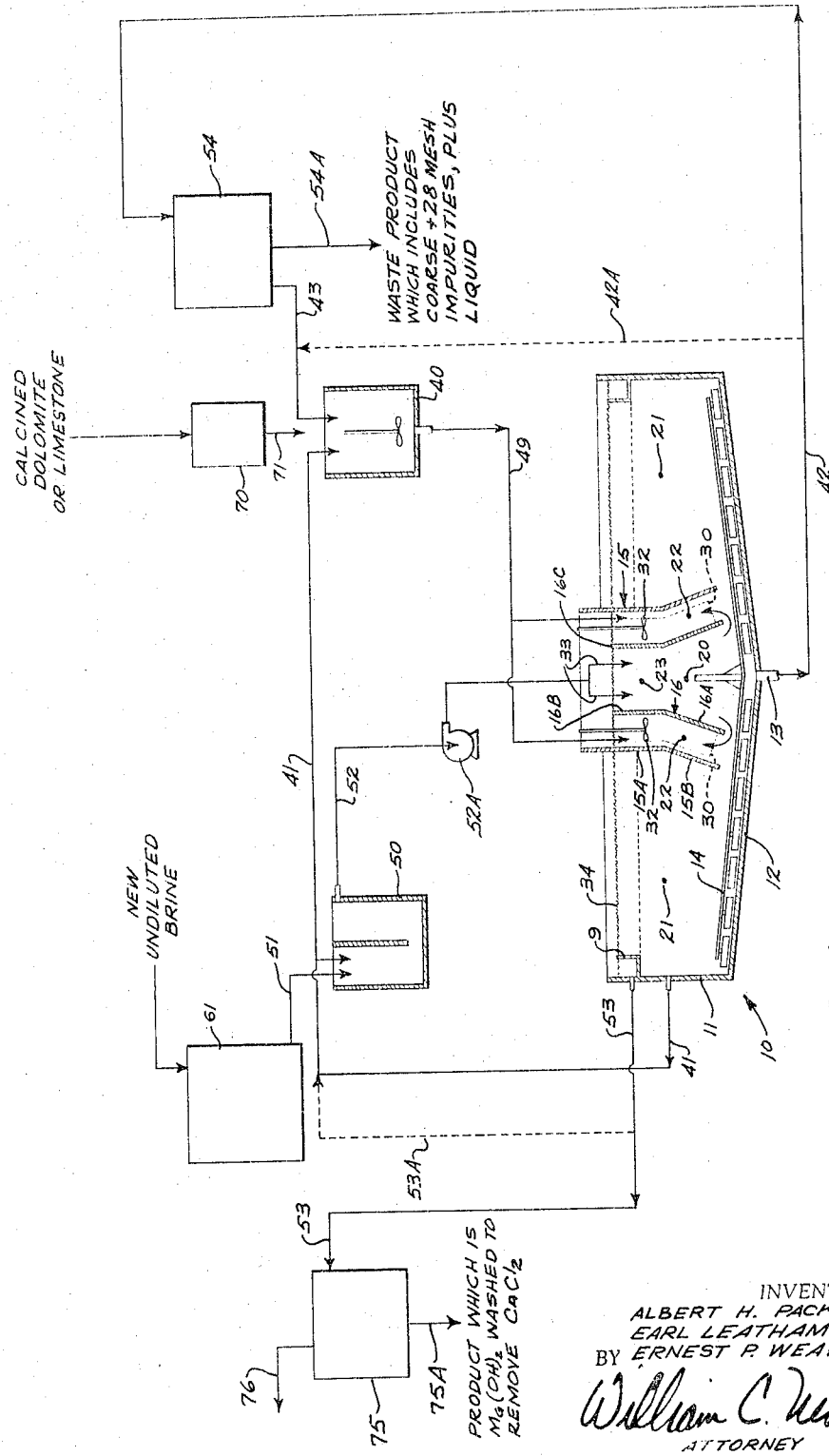
FIG. 1 is a schematic flow diagram in which the apparatus of FIG. 2 may be used.

Before describing the drawings in detail, it should be understood they are but exemplary of one of the modes now known for practice of the invention; but that the true spirit and scope of the invention is as defined in the hereafter appended claims. Also, all parts and percentages are by weight. All sizing is according to the Tyler standard series, unless otherwise specifically mentioned. All analyses are on the basis of an oxide analysis, unless otherwise specifically mentioned. All analyses, should, of course, be considered but typical.

Relating as it does to a process and apparatus for practice of the process, the invention is better understood by reference to specific examples. Considering FIG. 2, reactor apparatus 10 according to one method of applying the concepts of this invention, in essence, consists of a relatively large open topped vessel 11 having a bottom 12 sloping to a central outlet 13. A rake 14 rotates in close proximity to the bottom 12 to remove solids through the outlet 13, much in the manner of the rake in a thickener or a clarifier. A launder 9 about the upper periphery of the vessel 11 receives overflow from the reaction vessel. Substantially centrally suspended within the vessel 11 are a pair of concentric shells 15 and 16. Each of these shells is comprised of an upper cylindrical or tubular section and a lower outwardly flaring skirt portion. These would be such as the tubular section 15A and outwardly flaring skirt section 15B of the shell 15. These concentric shells divide the reactor vessel into four zones. These zones include the reactor zone 20, the settling zone 21, the high lime zone 22 through which flows a stream of lime-containing, magnesium ion free aqueous carrier fluid, and the fresh brine introduction zone 23.

The annular space between the shells 15 and 16 is divided by a plurality of tubular partitions 30 (best seen in FIG. 3) into a plurality of generally upright tubular passages 31. Each of these passages has a motor-driven impeller 32 suspended therein. The pitch of the impeller blades and the rotation of the motor which drives them are so arranged as to cause an upwardly flowing stream to be drawn from the bottom periphery of the reactor zone 20, which stream discharges into the top of the central well which confines the brine introduction zone 23.

The fresh brine and carrier fluid mixture is forcefully ejected by pump 52A into zone 23 through the pair of pipes or nozzles 33, which are immersed a substantial distance below the liquid level 34.

FIG. 4 shows an alternative arrangement, in which there are but two impellers 35A mounted in tubes 35B fixed on opposed sides of the shell 16D. The reactor zone 20A is confined within shell 16D. The stream moved by impellers 35A are drawn from the bottom periphery of the reactor zone, again similar to the arrangement of FIGS. 2 and 3. Brine nozzles 33A, vessel 11A, etc., are similar to the arrangement of FIGS. 2 and 3. This arrangement can be used for smaller operations.

FIG. 4A more clearly shows the elongate slots 35C which communicate between tubes 35B and shell 16D.

Considering now FIG. 1, the reactor of FIGS. 2 and 3 is shown in a schematic flow diagram. A line pre-mix tank 40 is positioned above the reactor vessel 11 for gravity flow thereto through line 49 into each of the zones 22 to introduce the free lime containing material mixed with the aqueous carrier fluid into the upwardly moving streams of aqueous carrier fluid, free of magnesium ions, drawn from the periphery of the reactor zone 20.

Additional aqueous carrier fluid is withdrawn from vessel 11 through line 41. Preferably, the line 41 enters at a position somewhat below the liquid level 34 in the vessel. This assures substantially uniform consistency in line 41 fluid, since it is drawn from a relatively quiescent portion of the body of fluid in vessel 11. We find the above most suitable for diluting new brine, although the liquid withdrawn from launder 9 through lines 53 and 53A is also useable.

A portion of the aqueous carrier fluid withdrawn through line 41 and/or line 53A is passed to the brine pre-mix 50, where it is intermixed with the incoming concentrated brine discharging from surge tank 61 and line 51. The diluted brine passes from brine pre-mix 50 through pump 52A, conduit 52 and nozzles 33 to the fresh brine introduction zone 23 and thence to the reactor zone 20. The remainder of line 41 (or line 53A) aqueous carrier fluid passes to the lime pre-mix 40.

Similarly, the solids which are withdrawn through outlet 13 and conduit 42 (magnesium hydroxide and any unreacted lime solids plus aqueous carrier fluid) are passed through a size classifying station 54 where a coarse fraction is rejected either to waste or to a grinding circuit prior to reintroduction to tank 40. The fine fraction of the solids drawn through 13 as well as the liquid may be passed throughout conduit 43 to the lime pre-mix tank 40. Note also a portion of the outlet 13 material may be drawn through line 42A directly to tank 40.

While the liquid recovered from the solids liquid separation may be introduced to the slaking tank 40, it is not recommended for introduction to the surge tank 50, since it may contain some residual and unreacted lime which could undesirably cause precipitation of magnesium hydroxide in the surge tank and the line interconnecting this with the reactor.

The overflow collected in the peripheral launder 9 contains the product magnesium hydroxide. This flows by conduit 53 to a series of washing thickeners or washing filters 75 for the removal of undesirable soluble salts such as calcium chloride. Product is discharged through line 75A; waste is discharged through line 76.

While in one embodiment we have shown concentric shells 15 and 16 of approximately the same depth, this is not necessary in all instances. However, it is essential that the skirt of the inner shell, such as skirt 16A of shell 16, extend downwardly a sufficient distance as to assure that the stream being drawn upwardly under the influence of impellers 32 is aqueous carrier fluid containing no, or substantially no magnesium chloride in solution. If the skirt 16A is too short, there is a short circuiting of the system with partially reacted brine being undesirably intermixed about the impellers 32. Considering a vessel on the order of 250 centimeters in height, and in which the reactor zone starts about 100 centimeters below the liquid level, the skirt 16A should extend downwardly to about 50 centimeters from the bottom. The outer shell 15 must always rise above liquid level 34. The relative outward slope of the skirts of the inner and outer shells should be sufficient to place the intake of the stream moving upwardly, under the influence of the impellers 32, a sufficient distance to the side and removed from the reactor zone 20 as to assure acceptable aqueous carrier fluid. In the exemplary vessel described above, about 60 centimeters to one side of a vertical center line passing through the reactor is acceptable. Of course, this intake should be spaced a sufficient distance above the bottom 12 and rake 14, as to minimize solids lifted under the influence of impellers 32. The diameter of the top of shell 16 would be on the order of 50 centimeters. The diameter of the top of outer shell 15 would be on the order of 110 centimeters.

The conduits or lines 33 have been described above as nozzles. By this we intend to infer ability to assure relatively high velocity brine discharge by pump 52A into the reactor zone 20. This high velocity discharge has an aspirating effect in the well enclosed by the tubular portion 16B of shell 16, causing violent intermixing of new brine with the stream discharging over the upper lip 16C of the shell 16, and assures that all unreacted free lime or dolomite is swept into the reactor zone and thoroughly dispersed through the unreacted diluted brine passing from the nozzles 33. This violent sweeping and intermixing assures that substantially all reaction occurs in the reactor zone 20, and that only aqueous carrier fluid is in the zone 21.

In essence, the apparatus of this invention provides a completely submerged reactor zone suspended, as it were, in a relatively large and quiescent body of mother liquor. This arrangement, with its provision for very large internal recirculation under the action of the impellers 32, has been found to recover almost 100% of the available magnesium ions from concentrated brine. These magnesium ions are recovered in the form of magnesium hydroxide of over 97% purity. By very large recirculation, we mean a recirculation volume per minute equal to over about 90% of the total volume of material in such as vessel 11. This maintains a magnesium hydroxide concentration in the reaction zone above about 50 grams per liter, calculated as MgO.

For example, assuming a capacity for vessel 11 to be on the order of 50,000 gallons, on the order of 45,000 gallons per minute is recirculated internally of the reactor. Total recirculation gallonage is the summation of the aqueous carrier fluid in the streams drawn upwardly through zones 22 by impellers 32, the aqueous carrier fluid introduced with the dolomite or lime, and the aqueous carrier fluid introduced with new brine. The volume of solids and liquids passing through line 53 to the thickener 75 and line 54A from size classification station 54 are equal in volume to the lime or dolomite entering the vessel from storage area 70 through conveyor 71, and new brine entering through line 51.

Several variations of the above outlined process can be used, providing the recirculation of what we have termed aqueous carrier fluid reduces the magnesium chloride concentration of the brine and the calcium oxide concentration of the lime slurry at the reactor zone 20 to less than about 1 gram per liter at least immediately prior to any reaction of the magnesium chloride and the calcium oxide. These variations may include recirculating a portion of reactor overflow 53 directly to the vessel 11, or introducing it to the pre-mixing tanks 40 to 50. Further, the lime-containing material may be introduced directly from line 71 into the upwardly moving streams in zone 22, rather than premixing in the tank 40. By increasing the velocity of the streams moving upwardly under the influence of impellers 32, a smaller quantity of liquid can be withdrawn through lines 41 or 53. The essential point here, however, is internal recirculation must be increased proportionately, so the magnesium chloride and calcium oxide concentration in the reactor zone immediately prior to the reaction is less than one gram per liter.

Having thus described the invention in detail and with sufficient particularity as to enable those skilled in the art to practice it, what is desired to have protected by Letters Patent is set forth in the following claims.

We claim:

1. An arrangement for recovery of magnesian values from concentrated magnesium salt-containing aqueous solutions comprising; a reactor vessel, a slurry vessel and a dilution vessel, said reactor vessel having a bottom discharge opening for withdrawing settling solids in the reactor vessel, means connected to the discharge for transporting said solids to a disposal, at least two adjacent tubular shells substantially centrally suspended within the vessel, said shells being arranged to define a path for the flow of fluid therebetween, fluid agitating means disposed within an upper section of one of said shells for drawing fluid upwardly through said shell and enabling downward flow through an adjacent shell, first conduit means opening from said vessel at a point above the bottom discharge opening and interconnected with said slurry vessel and dilution vessel for circulating a volume of fluid from the reaction vessel to said slurry and dilution vessels, second conduit means opening from said reaction vessel at a point above said fluid agitating means to withdraw a volume of fluid from said reaction vessel and pass it to washing and thickening means, washing and thickening means arranged to recover magnesium hydroxide substantially free of magnesium chloride impurities from the fluid passed thereto, channel means connecting the slurry vessel and the tubular shell containing the fluid agitating means for delivering a mixture of lime containing material and fluid thereto, and channel means connecting the dilution vessel and other tubular shell for delivering a mixture of concentrated magnesium salt containing solution and fluid thereto.

2. A reactor vessel useful in the recovery of magnesian values from concentrated magnesium salt-containing aqueous solutions and comprised of, an open topped vessel, a bottom discharge opening from said vessel, at least two adjacent tubular shells substantially centrally suspended within the vessel, said shells having an upper cylindrical section and a lower outwardly flaring skirt portion, said shells being arranged to define a tubular path for the flow of fluid therebetween, fluid agitating means disposed within the upper cylindrical section of one of said shells for drawing fluid upwardly through said shell and enabling downward flow through an adjacent shell, first conduit means opening from said vessel at a point a short distance above the outwardly flaring skirt portions of said shells for withdrawing fluid from the reactor vessel, and second conduit means opening from said vessel at a point above the fluid agitating means and a short distance below the upper end of the shells for withdrawing fluid from the reactor vessel.

3. A reactor vessel according to claim 2 in which said shells are concentric and the fluid agitating means are disposed only within the outer concentric shell.

4. A reactor vessel according to claim 3 in which the outer concentric shell is carried by the inner shell.

5. A reactor vessel according to claim 3 in which the outwardly flaring skirt portion of the inner shell extends below the outwardly flaring skirt portion of the outer concentric shell and the upper cylindrical section of the outer concentric shell extends above the upper cylindrical section of the inner shell.

6. A reactor vessel according to claim 3 in which the annular space between the concentric shells is traversed by a plurality of divider means to form a plurality of upright passages in which fluid agitating means are disposed within each of said passages.

7. A reactor vessel according to claim 2 which consists of three independent tubular shells, two of the shells sandwiching the third shell therebetween in contiguous contact therewith, there being a passage defining slot in the upper cylindrical sections of the shells at the point of contact to define a path for the flow of fluids between each of the sandwiching shells and the third shell, each of the sandwiching shells having fluid agitating means disposed therein.

8. A reactor vessel useful in the recovery of magnesian values from concentrated magnesium salt-containing aqueous solutions and comprised of, an open top vessel, a bottom discharge opening from said vessel, conduit means opening from said vessel at a point above said bottom discharge, passage defining first means suspended substantially centrally within said reactor vessel, said first means having an upper intake and lower outlet, the outlet of said first means spaced above said bottom discharge and the intake of said first means being spaced a distance below the open top of said reactor vessel, passage defining second means having an upper outlet and a lower inlet, said second means operatively interconnected with said first means so the inlet of said second means is adjacent the outlet of said first means and the outlet of the second means is adjacent the inlet of the first means so as to define a path for the flow of fluid between the outlet of the first means and the intake of the first means, said second means surrounding the first means from its top to its bottom to form an annular space which annular space between the first and second means is traversed by a plurality of divider means to form a plurality of upright passages, pump means mounted within each upright passage arranged to move fluid therethrough from its intake to the intake to said first means, fluid passing through said second means being maintained out of contact with fluid in said reactor vessel until its discharge into said first means.

References Cited by the Examiner
UNITED STATES PATENTS 2,940,831   6/1960   Nossardi et al. _____ 23—201
3,152,982  10/1964   Pagnotti _____ 210—197 X MORRIS O. WOLK, *Primary Examiner.*

JAMES H. TAYMAN, JR., *Examiner.*